United States Patent
Kunitsu et al.

(10) Patent No.: US 11,482,003 B2
(45) Date of Patent: Oct. 25, 2022

(54) INSTALLATION POSITION INFORMATION PROVIDING APPARATUS AND INSTALLATION POSITION INFORMATION PROVIDING METHOD

(71) Applicant: DENSO CORPORATION, Kariya (JP)

(72) Inventors: Akira Kunitsu, Kariya (JP); Hiroyasu Suzuki, Kariya (JP); Masato Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 60 days.

(21) Appl. No.: 16/915,419

(22) Filed: Jun. 29, 2020

(65) Prior Publication Data

US 2020/0327333 A1 Oct. 15, 2020

Related U.S. Application Data

(63) Continuation of application No. PCT/JP2019/000712, filed on Jan. 11, 2019.

(30) Foreign Application Priority Data

Jan. 11, 2018 (JP) .............................. JP2018-002794

(51) Int. Cl.
*G06V 20/40* (2022.01)
*G06T 7/70* (2017.01)
*G06V 10/75* (2022.01)
*G06V 20/20* (2022.01)
*G06V 20/62* (2022.01)

(52) U.S. Cl.
CPC ................ *G06V 20/46* (2022.01); *G06T 7/70* (2017.01); *G06V 10/75* (2022.01); *G06V 20/20* (2022.01); *G06T 2207/30252* (2013.01); *G06V 20/625* (2022.01)

(58) Field of Classification Search
CPC .. G06K 9/00744; G06K 9/00671; G06K 9/68; G06K 2209/15; G06T 7/70; G06T 2207/30252
USPC ......................................................... 382/103
See application file for complete search history.

(56) References Cited

U.S. PATENT DOCUMENTS

2018/0165828 A1* 6/2018 Sasatani ............. G06K 9/00201
2019/0121217 A1* 4/2019 Ikeda ..................... G03B 17/18

FOREIGN PATENT DOCUMENTS

| JP | 2004069658 A | 3/2004 |
| JP | 2004085325 A | 3/2004 |
| JP | 2010048673 A | 3/2010 |
| JP | 2010156609 A | 7/2010 |

* cited by examiner

*Primary Examiner* — Ayodeji O Ayotunde
(74) *Attorney, Agent, or Firm* — Harness, Dickey & Pierce, P.L.C.

(57) ABSTRACT

In an installation position information providing apparatus, specific two parts in a vehicle or in a vicinity of the vehicle and a floor surface on which the vehicle is mounted are recognized from a video that is captured, an installation position of an adjustment facility in the video is calculated based on the two parts and the floor surface that are recognized, and an installation position object indicative of the installation position is displayed at the installation position that is calculated in a superimposed manner, in the video that is displayed.

8 Claims, 9 Drawing Sheets

INSTALLATION POSITION INFORMATION PROVIDING APPARATUS AND INSTALLATION POSITION INFORMATION PROVIDING METHOD

CROSS REFERENCE TO RELATED APPLICATIONS

The present application is a continuation application of International Patent Application No. PCT/JP2019/000712 filed on Jan. 11, 2019, which designated the U.S. and claims the benefit of priority from Japanese Patent Application No. 2018-002794 filed on Jan. 11, 2018. The entire disclosures of all of the above applications are incorporated herein by reference.

TECHNICAL FIELD

The present disclosure relates to an installation position information providing apparatus and an installation position information providing method.

BACKGROUND

Conventionally, there has been known a technique for providing an installation position of an adjustment facility used for an adjustment work of an in-vehicle sensor.

SUMMARY

The present disclosure provides an installation position information providing apparatus and an installation position information in which specific two parts in a vehicle or in a vicinity of the vehicle and a floor surface on which the vehicle is mounted are recognized from a video that is captured, an installation position of an adjustment facility in the video is calculated based on the two parts and the floor surface that are recognized, and an installation position object indicative of the installation position is displayed at the installation position that is calculated in a superimposed manner, in the video that is displayed.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
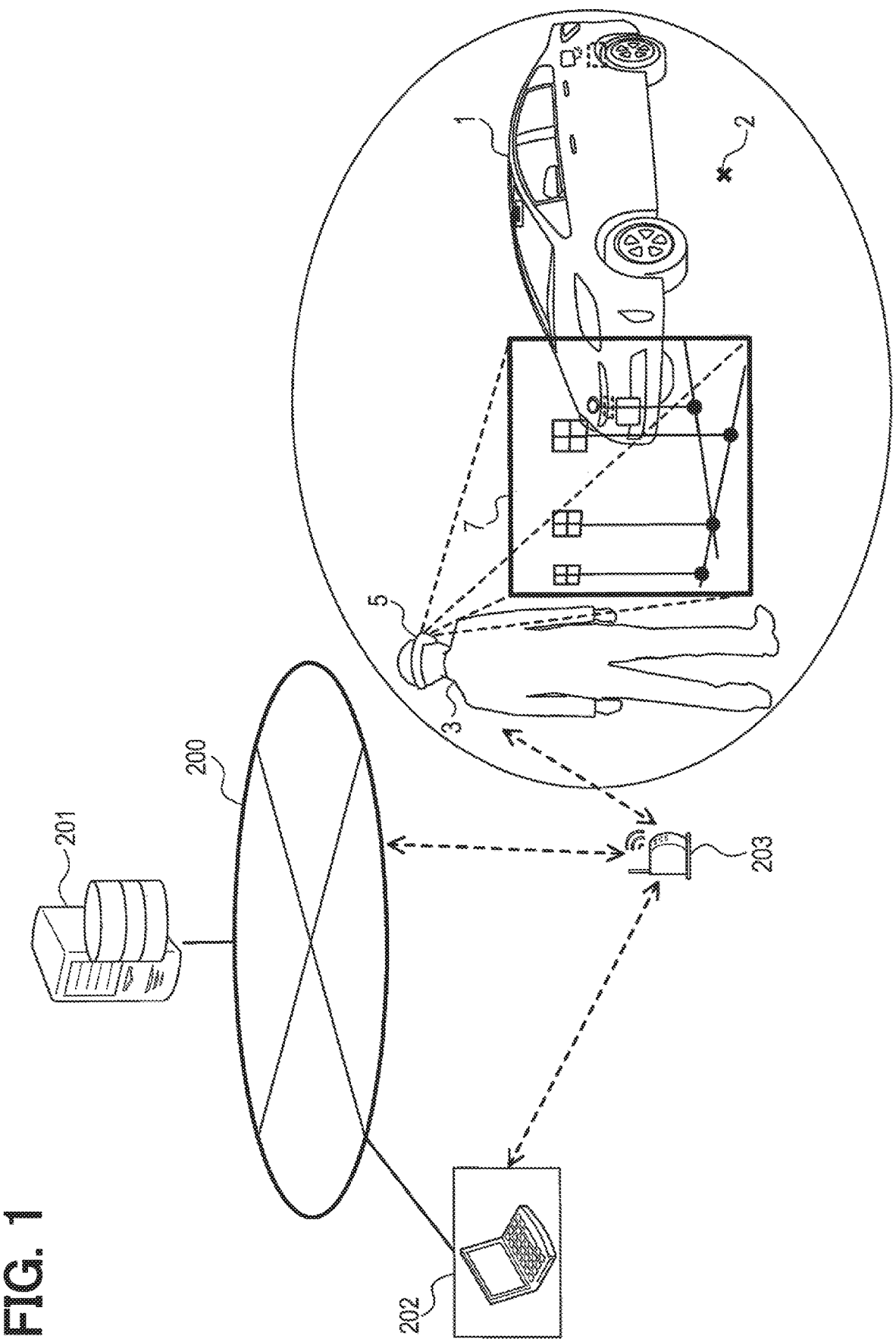
FIG. 1 is an illustrative diagram showing an overall configuration of an in-vehicle sensor adjustment support system according to an embodiment.

There is a technique of adjusting an optical axis or an angle axis of an in-vehicle sensor such as an in-vehicle camera or a radar device by use of an adjustment device installed outside a vehicle.

In order to perform the adjustment work of the in-vehicle sensor with high accuracy, there is a need to install an adjustment device necessary for the adjustment work at an appropriate position. The installation work of the adjustment device is generally carried out while multiple workers perform various surveys. As a result of detailed examination by the present inventors, an issue has been found that such an installation work requires a lot of man-hours.

An installation position information providing apparatus according to an aspect of the present disclosure includes an imaging device capturing a video, a display device displaying the video captured by the imaging device, a recognition unit, a calculation unit, and a superimposing display unit. The recognition unit recognizes specific two parts in a vehicle or in a vicinity of the vehicle included in the video and a floor surface included in the video and on which the vehicle is mounted, from the video captured by the imaging device. The calculation unit calculates an installation position of an adjustment facility in the video based on the two parts and the floor surface recognized by the recognition unit. The adjustment facility is used for an adjustment work of an in-vehicle sensor mounted on the vehicle. The superimposing display unit displays an installation position object at the installation position calculated by the calculation unit in a superimposed manner, in the video displayed on the display device. The installation position object is an image indicative of the installation position.

An installation position information providing method according to another aspect of the present disclosure includes: capturing a video; displaying the video that is captured; recognizing specific two parts in a vehicle or in a vicinity of the vehicle included in the video and a floor surface included in the video and on which the vehicle is mounted, from the video that is captured; calculating an installation position of an adjustment facility in the video based on the two parts and the floor surface that are recognized, the adjustment facility being used for an adjustment work of an in-vehicle sensor mounted on the vehicle; and displaying an installation position object at the installation position that is calculated in a superimposed manner, in the video that is displayed, the installation position object being an image indicative of the installation position.

An installation position information providing apparatus according to another aspect of the present disclosure includes an imaging device configured to capture a video, a display device configured to display the video captured by the imaging device, a processor, and a memory. The memory stores instructions configured to, when executed by the processor, cause the processor to: recognize specific two parts in a vehicle or in a vicinity of the vehicle included in the video, and a floor surface included in the video and on which the vehicle is mounted, from the video captured by the imaging device; calculate an installation position of an adjustment facility in the video based on the two parts and the floor surface that are recognized, the adjustment facility being used for an adjustment work of an in-vehicle sensor mounted on the vehicle; and display an installation position object at the installation position that is calculated in a superimposed manner, in the video displayed by the display device, the installation position object being an image indicative of the installation position.

According to the aspects described above, the installation position of the adjustment facility is calculated based on the specific two parts and the floor surface that are recognized from the captured video, and the installation position object is displayed at the calculated installation position in the superimposed manner in the video. As a result, the worker can easily grasp the installation position from the video that is displayed. Then, the worker can install the adjustment facility at an appropriate position by installing the adjustment facility so that the actual adjustment facility matches the position of the installation position object displayed in the superimposed manner while watching the video.

This makes it possible to easily provide the installation position of the adjustment facility of the in-vehicle sensor to the worker with a small number of man-hours.

Exemplary embodiments of the present disclosure will be described below with reference to the drawings.

1. Embodiments (1-1) Overall Configuration of in-Vehicle Sensor Adjustment Support System An in-vehicle sensor adjustment support system according to the present embodiment shown in FIG. 1 includes a server 201, a personal computer (hereinafter, abbreviated as "PC") 202, a relay device 203, and an installation position information providing apparatus (hereinafter, abbreviated as "AR device") 5. Note that "AR" is an abbreviation of "Augmented Reality".

The relay device 203 relays a data communication by radio. In other words, the relay device 203 can perform a data communication with the PC 202 by radio, and can perform a data communication with the server 201 through the communication network 200 by radio. The PC 202 is capable of performing a data communication with the server 201 through the communication network 200 or through the relay device 203 and the communication network 200. The AR device 5 has a wireless communication function, and can perform a data communication with the PC 202 and the server 201 through the relay device 203. In other words, the AR device 5, the server 201, and the PC 202 can perform a data communication with each other.

The specific configuration of the communication system in which the AR device 5, the server 201, and the PC 202 can perform a data communication with each other is not limited to the configuration shown in FIG. 1. For example, the AR device 5 may be capable of directly communicating with the server 201 or the PC 202 not through the relay device 203. For example, the communication network 200 may be a wired network or a wireless network.

The server 201 stores vehicle type information for each vehicle including the vehicle 1. The server 201 further stores object data indicating an installation position object for each of various adjustment facilities, the details of which will be described later. The installation position object is an image indicating an installation position of the adjustment facility. The server 201 further stores various pieces of work related information (for example, work procedures) relating to adjustment work (to be described later) for each of various adjustment facilities.

The installation position objects corresponding to the same type of adjustment facilities may be prepared individually for each vehicle or for each vehicle type. For example, the same installation position object may be prepared for multiple specific vehicles or vehicle types. The same applies to the work related information.

The PC 202 can download and store vehicle type information, object data, and work related information from the server 201. The PC 202 may be capable of uploading the vehicle type information, the installation position object, and the work related information to the servers 201.

The AR device 5 can download and acquire the vehicle type information, the installation position object, and the work related information from the server 201 or the PC 202.

The AR device 5 is a so-called goggle-type image information providing apparatus mounted on a head of the worker 3. A video 7 captured by a camera 32 (see FIG. 2), which will be described later, is displayed in real time on the AR device 5. When the AR device 5 is properly mounted on the worker 3, the video 7 shows a front of the worker 3.

The worker 3 may perform an adjustment work of various in-vehicle sensors provided in the vehicle 1, for example, in the following procedure. In other words, the worker 3 first brings the vehicle 1 into storage on a floor surface 2 in a predetermined work area. Next, the worker 3 installs an adjustment facility corresponding to the in-vehicle sensor to be adjusted at a predetermined position on the floor surface 2 outside the vehicle 1. The worker 3 performs the adjustment work of the corresponding in-vehicle sensor by use of the adjustment facility.

The in-vehicle sensor adjustment support system according to the present embodiment is used when the adjustment work is performed. Specifically, the in-vehicle sensor adjustment support system provides the worker 3 with an installation position of the adjustment facility through the AR device 5 so that the worker 3 can easily and efficiently install the adjustment facility.

In other words, the AR device 5 displays the video 7, and further displays an installation position object indicative of the installation position of the adjustment facility at a position in the video 7 where the adjustment facility is to be installed in response to the operation of the worker 3.

The AR device 5 has a vision-based augmented reality function. The AR device 5 displays the installation position object on the installation position where the adjustment facility is to be installed in the actual video 7 in a superimposed manner by the augmented reality function.

In the vehicle 1 of the present embodiment, a front camera 16 (see FIG. 4), a millimeter wave radar sensor 17 (see FIG. 4), a right rear radar 18 (see FIG. 7), and a left rear radar 19 (see FIG. 7) are provided as in-vehicle sensors.

The front camera 16 is provided in front of a vehicle compartment of the vehicle 1, and images the front of the vehicle 1. The image captured by the front camera 16 is used for various driving support systems such as a collision prevention support system and a lane departure prevention support system mounted on the vehicle 1, for example.

The millimeter wave radar sensor 17 is provided, for example, on a back side of a front bumper in the vehicle 1. The millimeter wave radar sensor 17 radiates radio waves in the millimeter wave band, and receives reflected waves reflected by a target in front of the vehicle 1. The millimeter wave radar sensor 17 detects a position of and a distance to a target based on the radiation wave and the reflected wave.

The detection result by the millimeter wave radar sensor 17 is used for various driving support systems such as the collision prevention support system and an obstacle warning system mounted on the vehicle 1, for example.

The right rear radar 18 and the left rear radar 19 are basically configured in the same manner as that of the millimeter wave radar sensor 17. The right rear radar 18 detects the position and distance of a target present at the right rear of the vehicle 1, and the left rear radar 19 detects the position of and the distance to the target present at the left rear of the vehicle 1. The right rear radar 18 and the left rear radar 19 are used, for example, in various driving support systems such as a blind spot monitor system mounted on the vehicle 1.

In order for the front camera 16 to image an appropriate area in front of the vehicle 1, there is a need to properly adjust the optical axis of the front camera 16. The adjustment facility used for adjusting the optical axis is, for example, three target plates (not shown).

When the worker 3 adjusts the optical axis of the front camera 16, the worker 3 places the three target plates at predetermined positions in front of the vehicle 1. Then, the three target plates are imaged by the front camera 16, and the optical axis of the front camera 16 is appropriately adjusted based on the captured images of the three target plates.

In order to properly adjust the optical axis of the front camera 16, there is a need to correctly install each of the three target plates at the predetermined position. The AR device 5 is configured to be able to provide the worker 3 with the installation positions of the three target plates. Specifically, in the video 7 displayed on the AR device 5, installation position objects 106 to 108 (see FIG. 5) indicating the installation positions of the three target plates are displayed at the positions where the target plates are to be installed.

In order to enable the millimeter wave radar sensor 17 to accurately detect the target, there is a need to appropriately adjust the angle axis of the millimeter wave radar sensor 17 (that is, the radiation angle of the radar wave). The adjustment facility used for adjusting the angle axis is a reflector (not shown).

When adjusting the angle axis of the millimeter wave radar sensor 17, the worker 3 installs the reflector at a predetermined position in front of the vehicle 1. The millimeter wave radar sensor 17 radiates a radar wave and receives a reflected wave of the radar wave reflected by the reflector, and appropriately adjusts the angle axis based on the received reflected wave.

In order to properly adjust the angle axis of the millimeter wave radar sensor 17, there is a need to correctly install the reflector at a predetermined position. The AR device 5 is configured to be able to provide the installation position of the reflector to the worker 3. More specifically, in the video 7 displayed on the AR device 5, an installation position object 112 (see FIG. 6) indicative of the installation position of the reflector is displayed at a position where the reflector is to be installed.

In order to enable the right rear radar 18 and the left rear radar 19 to accurately detect the target, there is a need to properly adjust the respective angle axes. The adjustment facility used for adjusting the angle axis is a reflector (not shown).

When adjusting the angle axes of the right rear radar 18 and the left rear radar 19, the worker 3 installs the reflector at predetermined positions on the right rear side and the left rear side of the vehicle 1. Then, each of the right rear radar 18 and the left rear radar 19 radiates a radar wave, receives a reflected wave of the radar wave reflected by the reflector, and appropriately adjusts the angle axis based on the received reflected wave.

In order to properly adjust the angle axes of the right rear radar 18 and the left rear radar 19, there is a need to correctly install each reflector at a predetermined position. The AR device 5 is configured to be able to provide the installation position of each reflector to the worker 3. Specifically, a first installation position object 83 (see FIG. 7) and a second installation position object 93 (see FIG. 7) indicating the installation position of each reflector are displayed at the position where each reflector is to be installed in the video 7 displayed on the AR device 5.

(1-2) Configuration of AR Device

Figure 2:
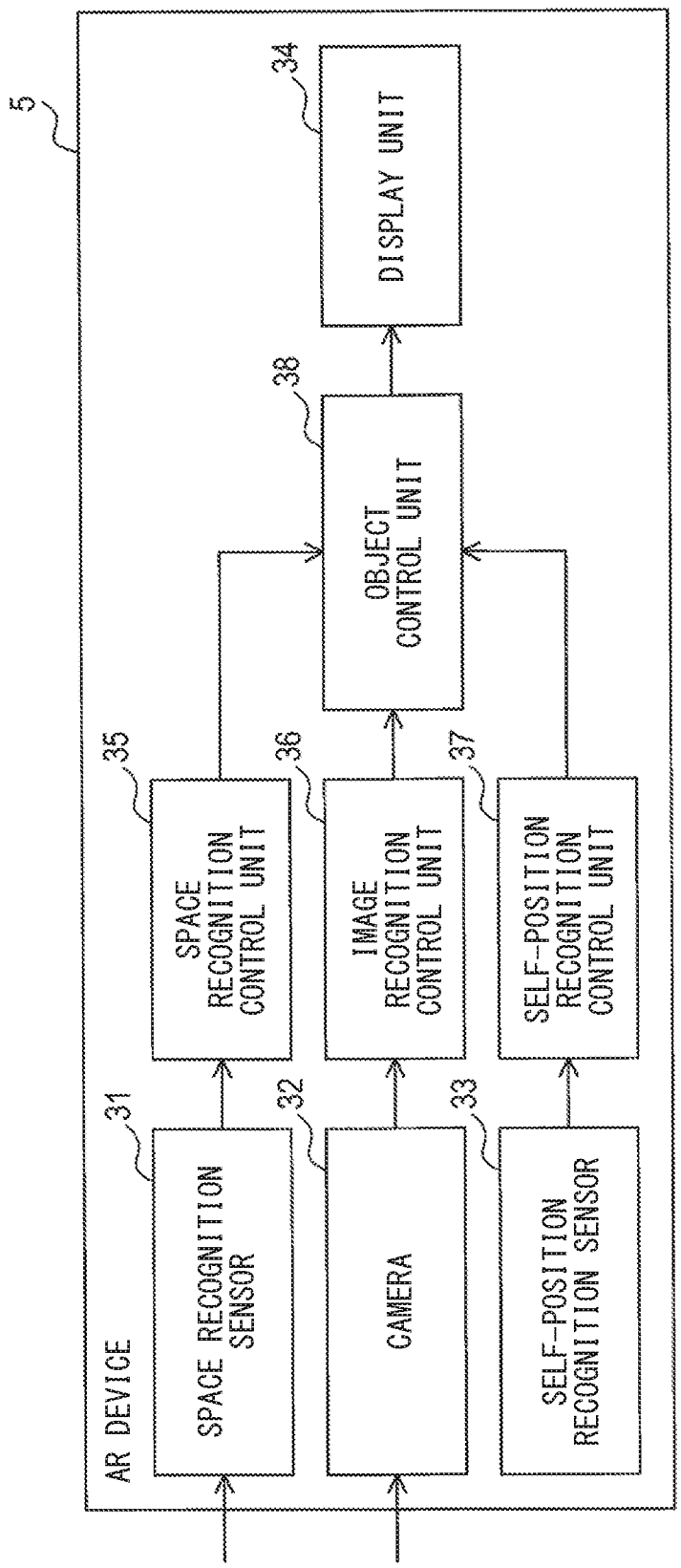
FIG. 2 is a block diagram showing a schematic configuration of an AR device.

As shown in FIG. 2, the AR device 5 includes a space recognition sensor 31, a camera 32, a self-position recognition sensor 33, and a display unit 34.

The space recognition sensor 31 acquires information indicating various objects existing in front of the AR device 5. A specific configuration of the space recognition sensor 31 is not particularly limited. In the present embodiment, the space recognition sensor 31 is, for example, a laser sensor. A space in front of the AR device 5 is three-dimensionally detected, and space information as the detection result is detected by the space recognition sensor 31.

The camera 32 captures a video in front of the AR device 5, and outputs the captured data. The camera 32 according to the present embodiment captures a video (that is, a moving image) at a specific frame rate.

The self-position recognition sensor 33 detects a position of the AR device 5 itself in a three-dimensional space, more specifically, a direction (angle) of the AR device 5, for example, and outputs self-position information as the detection result. A specific configuration of the self-position recognition sensor 33 is not particularly limited. In the present embodiment, the self-position recognition sensor 33 is, for example, a gyro sensor.

The display unit 34 is configured to be capable of displaying an image. The display unit 34 displays a video indicated by video data output from the camera 32, that is, the video 7. The display unit 34 displays various objects in addition to the video 7 based on display information from the object control unit 38. The display unit 34 is mounted on the AR device 5 so that the worker 3 who properly wears the AR device 5 on his or her head can visually recognize a video or an image such as the video 7.

The AR device 5 further includes a space recognition control unit 35, an image recognition control unit 36, a self-position recognition control unit 37, and an object control unit 38.

The space recognition control unit 35 periodically acquires the space information detected by the space recognition sensor 31, analyzes the space information in real time, and three-dimensionally recognizes the space in front of the AR device 5 in real time based on the analysis result. The space recognition control unit 35 outputs the space recognition information indicating the recognition result to the object control unit 38.

The image recognition control unit 36 recognizes a specific image in the captured video (that is, the video 7) based on the image data output from the camera 32. In the present embodiment, the image recognition control unit 36 extracts feature points in the video 7, and can recognize various images based on the extracted feature points. The images recognizable by the image recognition control unit 36 include, for example, emblems, license plates, and specific markers provided at the front end and the rear end of various vehicles.

Figure 4:
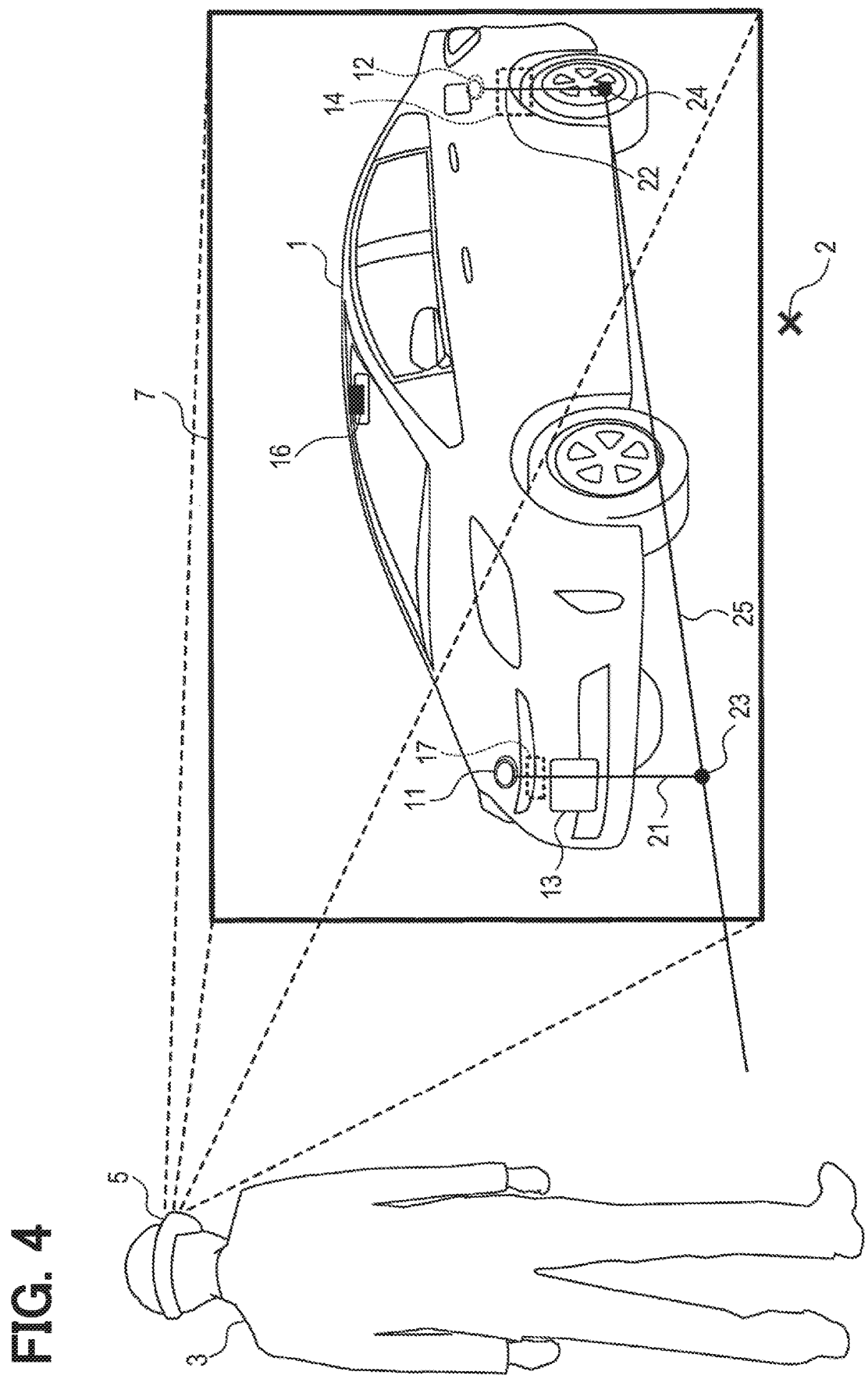
FIG. 4 is an illustrative diagram showing an example in which a reference point and a reference line are superimposed and displayed on the AR device.

As shown in FIG. 4, the vehicle 1 according to the present embodiment includes a front emblem 11 and a front license plate 13 which are provided at the front end of the vehicle 1, and a rear emblem 12 and a rear license plate 14 which are provided at the rear end of the vehicle 1. In addition to being able to recognize the vehicle 1 itself, the image recognition control unit 36 is able to individually recognize the emblems 11 and 12 and the license plates 13 and 14 in the vehicle 1.

The information on various images recognizable by the image recognition control unit 36 may be stored in advance in a memory (not shown) in the AR device 5, or the information may be downloadable from the server 201 or the PC 202.

The image recognition control unit 36 outputs the image recognition information indicating the recognition result of the image to the object control unit 38 together with the image data. In addition, the image recognition control unit 36 can continuously recognize an image recognized once even if the position or angle of the camera 32 changes and the captured video changes due to the tracking function.

The self-position recognition control unit 37 recognizes the direction (angle) of the AR device 5 based on the self-position information output from the self-position recognition sensor 33. Then, the self-position recognition control unit 37 outputs the self-position recognition information indicating the recognition result to the object control unit 38.

The object control unit 38 displays the video 7 on the display unit 34 based on the image data input from the image recognition control unit 36.

In addition, the object control unit 38 performs various processes for calculating the installation position of the adjustment facility based on the space recognition information input from the space recognition control unit 35, the image recognition information input from the image recognition control unit 36, the self-position recognition information input from the self-position recognition control unit 37, the vehicle type information acquired from the servers 201 or PC 202 by a wireless communication, the object data, the work related information, and the like. Then, the object control unit 38 displays the installation position object at a position corresponding to the calculated installation position in the video 7. The object control unit 38 can also display work related information in response to a user operation.

The installation position of the adjustment facility is uniquely determined according to the vehicle type and the type of the in-vehicle sensor to be adjusted. In other words, a relative positional relationship between the vehicle 1 and the installation position object is uniquely determined. For that reason, the object control unit 38 changes the display position, the display angle, the size, and the like of the installation position object so that the relative positional relationship is maintained in accordance with a change of the input various information (that is, each time the direction or position of the AR device 5 changes).

In other words, even if the worker 3 moves or changes the angle or direction of the AR device 5, the relative relationship between the vehicle 1 and the installation position object displayed on the video 7 is maintained constant.

For that reason, for example, when the worker 3 faces the rear of the vehicle 1 so that the installation position of the adjustment facility does not enter the video 7, the installation position object is not displayed on the video 7. Then, when the worker 3 faces the front of the vehicle 1 again and the installation position of the adjustment facility enters the video 7, the installation position object is displayed again on the video 7.

Further, for example, when the worker 3 moves the place and views the vicinity of the installation position of the adjustment facility from another angle, the display angle of the installation position object in the video 7 also changes in accordance with the position and direction after the movement. Further, for example, when the worker 3 moves away from the vehicle 1, the sizes of the vehicle 1 and the installation position object in the video 7 are reduced accordingly.

The AR device 5 includes a computer (not shown). The computer (not shown) includes a CPU, a memory, and the like. The memory includes various semiconductor memory devices such as a ROM, a RAM, and a flash memory. The memory stores a program of in-vehicle sensor adjustment support process shown in FIG. 3, which will be described later.

The space recognition control unit 35, the image recognition control unit 36, the self-position recognition control unit 37, and the object control unit 38 represent functional blocks realized by causing the CPU to execute a program of the in-vehicle sensor adjustment support process. In other words, the functions of the space recognition control unit 35, the image recognition control unit 36, the self-position recognition control unit 37, and the object control unit 38 are provided by software.

However, at least some or all of those functions may be realized by use of one or multiple hardware instead of processing by software.

(1-3) In-Vehicle Sensor Adjustment Support Process

Next, the in-vehicle sensor adjustment support process executed by the above-described CPU in the AR device 5, that is, the in-vehicle sensor adjustment support process for realizing the functions of the space recognition control unit 35, the image recognition control unit 36, the self-position recognition control unit 37, and the object control unit 38 will be described with reference to FIG. 3.

When the worker 3 performs a specific start operation for starting the in-vehicle sensor adjustment support process on the AR device 5, the AR device 5 (CPU, in detail) starts the in-vehicle sensor adjustment support process.

When the in-vehicle sensor adjustment support process is started, the AR device 5 performs the vehicle type selection process in S110. Specifically, the AR device 5 displays a list of vehicle types on the display unit 34 based on various vehicle type information acquired from the server 201 or the PC 202. Then, the AR device 5 selects the vehicle 1 to be adjusted from the displayed list of vehicle types.

The vehicle type information may be stored in advance in a memory of the AR device 5, may be downloaded from the server 201 or the PC 202 at a predetermined timing (for example, at startup or at a predetermined cycle) and stored in the memory, or may be downloaded and acquired from the server 201 or the PC 202 when the process in S110 is executed.

A method of selecting the vehicle 1 to be subjected to the adjustment work from the list of vehicle types may be performed by any method. For example, the worker 3 may be able to select the vehicle 1 by showing a specific gesture with respect to an item indicating the vehicle 1 in the list of vehicle types displayed in the video 7 (for example, by showing a gesture such that the gesture of the worker 3 is superimposed on the item indicating the vehicle 1 in the video 7).

The vehicle type of the vehicle 1 may be automatically identified by image recognition of the vehicle 1 displayed on the video 7 by use of, for example, the image recognition function without requiring a selection operation by the worker 3.

In S120, a vehicle reference point determination process is performed. Specifically, first, the functions as the space recognition control unit 35 and the self-position recognition control unit 37 described above are executed. In other words, the space recognition information and the self-position recognition information described above are generated based on the space information detected by the space recognition sensor 31 and the self-position information output from the self-position recognition sensor 33, and the forward space is recognized three-dimensionally based on those pieces of information. Then, the function as the object control unit 38 is executed. In other words, the floor surface 2 is recognized from the recognized front space.

The method of recognizing the floor surface 2 may be performed by any method. For example, when the floor surface 2 is displayed on the video 7 displayed on the display unit 34, the position at which the gesture is displayed may be recognized as the floor surface 2 by allowing the worker 3 to show a specific gesture on the displayed floor surface 2 (for example, showing the gesture such that the gesture of the worker 3 is superimposed on the floor surface 2 in the video 7). Alternatively, a specific marker placed on the floor surface 2 may be recognized by the function of the image recognition control unit 36, and the floor surface 2 may be recognized based on the recognition result (that is, based on the recognized marker).

When recognizing the floor surface 2, the CPU calculates the relative positional relationship between the recognized floor surface 2 and the position of the AR device 5 in a three-dimensional coordinate space. As a result, the relative positional relationship between the recognized floor surface 2 and the AR device 5 is determined.

Next, the CPU calculates a center line 25 of the vehicle 1 shown in FIG. 4. In order to calculate the center line 25, first, the CPU recognizes center points in the vehicle width direction at two positions in the front and rear of the vehicle 1.

In the present embodiment, specifically, the front emblem 11 and the rear emblem 12 of the vehicle 1 are recognized as images indicating the center in the vehicle width direction. This recognition is a function of the image recognition control unit 36. For example, when the worker 3 moves to a position where the front emblem 11 is displayed in the video 7, the worker 3 recognizes the front emblem 11 from the video 7. This recognition may be performed automatically, for example, by collating with data of the front emblem 11 stored in advance in the memory. Further, for example, the worker 3 may indicate a specific gesture to the front emblem 11 displayed in the video 7, so that the image showing the gesture in the video 7 may be recognized as the front emblem 11.

Then, after recognizing the front emblem 11, the worker 3 moves to the position where the rear emblem 12 is displayed in the video 7, to thereby recognize the rear emblem 12 from the video 7 by the function of the image recognition control unit 36 in the same manner as in the case of the front emblem 11.

Upon recognizing each of the emblems 11 and 12, the CPU generates a perpendicular line to the floor surface 2 from each of the recognized emblems 11 and 12. In other words, as shown in FIG. 4, the CPU generates a front perpendicular line 21 from the front emblem 11 to the floor surface 2 and a rear perpendicular line 22 from the rear emblem 12 to the floor surface 2. Then, the CPU calculates the front reference point 23 and the rear reference point 24. The front reference point 23 is an intersection point of the front perpendicular line 21 and the floor surface 2. The rear reference point 24 is an intersection point of the rear perpendicular line 22 and the floor surface 2.

Then, the CPU calculates a center line 25 passing through the front reference point 23 and the rear reference point 24. The center line 25 is a line on the floor surface 2. In this manner, the center line 25 on the floor surface 2 is calculated.

In S130, a vehicle reference point object display process is performed. More specifically, the front perpendicular line 21, the rear perpendicular line 22, and the center line 25 calculated in S120 are displayed in the video 7 in a superimposed manner. FIG. 4 shows an example of the video 7 in which the front perpendicular line 21, the rear perpendicular line 22, and the center line 25 are displayed in the superimposed manner.

In S140, an adjustment sensor selection process is performed. This process is a process of determining the in-vehicle sensor to be adjusted. Specifically, the display unit 34 displays a list of in-vehicle sensors based on the information on various in-vehicle sensors acquired from the server 201 or the PC 202.

In this instance, multiple in-vehicle sensors corresponding to multiple different vehicle types may be displayed in a list, but in the present embodiment, the vehicle types selected in S110, that is, the in-vehicle sensors that can be mounted (or are actually mounted) on the vehicle 1 to be adjusted are displayed in a list.

Then, the in-vehicle sensor to be adjusted is selected from the displayed list of in-vehicle sensors. The method of selecting the in-vehicle sensor may be performed by any method. For example, the worker 3 may be able to select the in-vehicle sensor by indicating a specific gesture to the in-vehicle sensor to be adjusted in the list of in-vehicle sensors displayed in the video 7.

The information on the in-vehicle sensor may be stored in advance in the memory of the AR device 5, may be downloaded from the server 201 or the PC 202 at predetermined timings (for example, at startup or at a predetermined cycle) and stored in the memory, or may be downloaded and acquired from the server 201 or the PC 202 when the process of S140 is executed.

In S150, it is determined which in-vehicle sensor is selected in S140. When the selected in-vehicle sensor is the millimeter wave radar sensor 17, the process proceeds to S160. In S160, as a function of the object control unit 38, an installation position object indicating a position at which an adjustment facility (that is, a reflector) used for an adjustment work of the millimeter wave radar sensor 17 is to be installed is displayed on the video 7.

Figure 6:
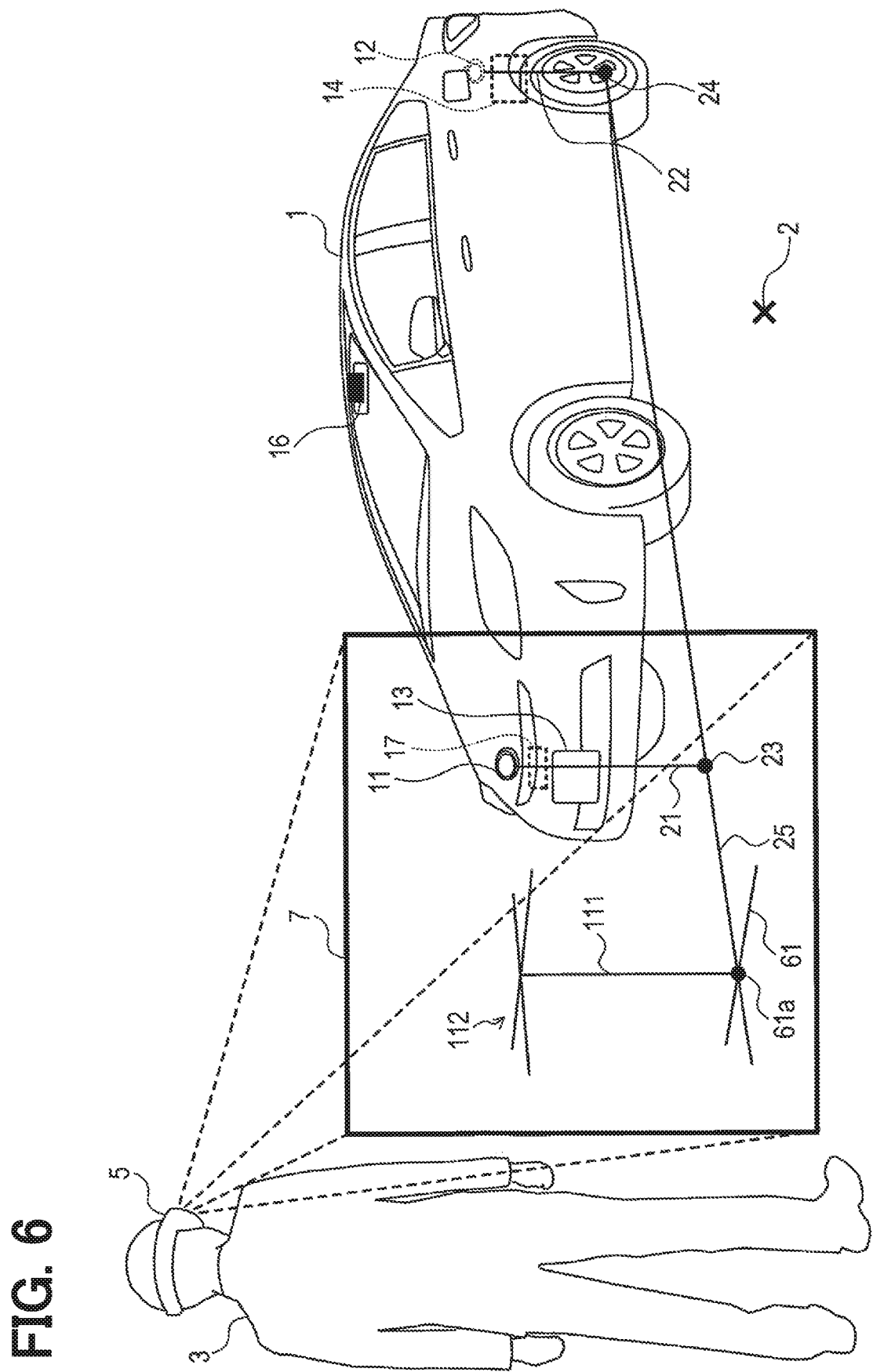
FIG. 6 is an illustrative diagram showing an example in which an installation position object corresponding to a millimeter wave radar sensor is displayed in a superimposed manner on the AR device.

Specifically, for example, as shown in FIG. 6, the installation reference point 61*a* is displayed at a position on the center line 25 which is a predetermined distance forward from the front reference point 23. Further, an installation reference line 61 passing through the installation reference point 61*a* and perpendicular to the center line 25 is displayed. The predetermined distance is set in advance in accordance with the vehicle type and the in-vehicle sensor to be adjusted. Further, an installation perpendicular line 111 perpendicular to the installation reference point 61*a* is displayed. Then, the installation position object 112 is displayed at a position at a predetermined height from the floor surface 2 in the installation perpendicular line 111. The predetermined height is also set in advance in accordance with the vehicle type and the in-vehicle sensor to be adjusted.

The relative positional relationship between the vehicle 1 and the installation position object 112 is constant. For that reason, when the worker 3 changes the direction or moves, the display position, angle, size, and so on of the installation position object 112 in the video 7 also change based on the relative positional relationship with the vehicle 1 following the movement of the direction or position.

The installation position object 112 is displayed on the video 7 in this manner, so that the worker 3 can clearly grasp where to install the reflector necessary for adjusting the angle axis of the millimeter wave radar sensor 17. The worker 3 can install the reflector at a correct position by installing the reflector so as to be superimposed on the installation position object 112 displayed on the AR device 5.

In S150, if the selected in-vehicle sensor is the front camera 16, the process proceeds to S170. In S170, as a function of the object control unit 38, an installation position object indicating a position at which an adjustment facility (that is, three target plates) used for an adjustment work of the front camera 16 is to be installed is displayed on the video 7.

Figure 5:
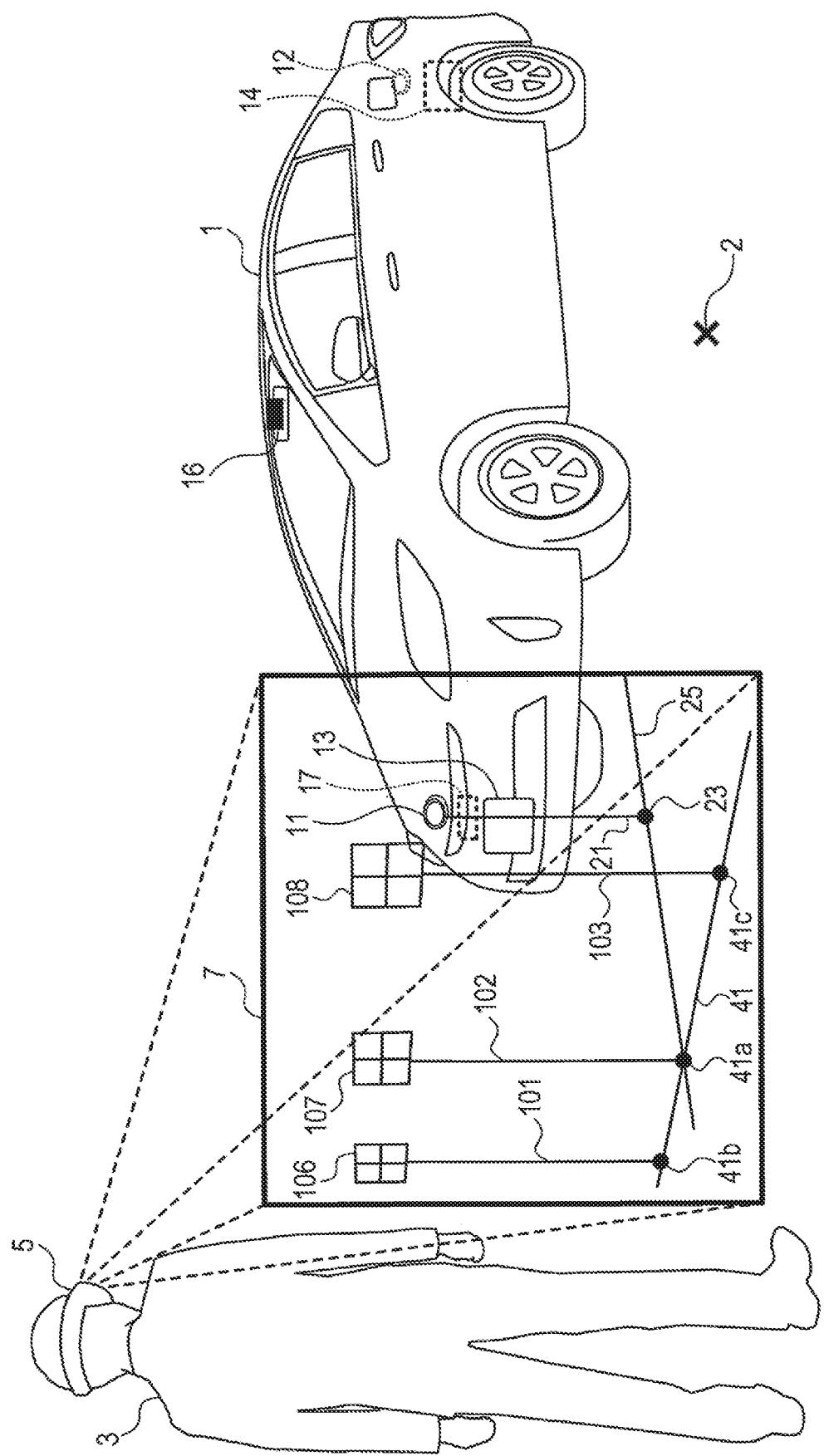
FIG. 5 is an illustrative diagram showing an example in which an installation position object corresponding to a front camera is displayed in a superimposed manner on the AR device.

More specifically, for example, as shown in FIG. 5, the first installation reference point 41*a* is displayed at a position in front of the front reference point 23 by a predetermined distance on the center line 25. Further, an installation reference line 41 passing through the first installation reference point 41*a* and perpendicular to the center line 25 is displayed. The predetermined distance is set in advance in accordance with the vehicle type and the in-vehicle sensor to be adjusted.

Further, in the installation reference line 41, the second installation reference point 41*b* and the third installation reference point 41*c* are displayed at positions separated from the first installation reference point 41*a* by a predetermined distance in both directions.

Perpendicular lines to the floor surface 2 from the respective installation reference points 41*a*, 41*b*, and 41*c*, that is, a first installation perpendicular line 101, a second installation perpendicular line 102, and a third installation perpendicular line 103 are displayed. Then, the installation position objects 106, 107, and 108 are displayed at positions at a predetermined height from the floor surface 2 in the installation perpendicular lines 101, 102, and 103, respectively. The predetermined height is also set in advance in accordance with the vehicle type and the in-vehicle sensor to be adjusted.

The relative positional relationship between the vehicle 1 and each of the installation position objects 106, 107, and 108 is also constant. For that reason, when the worker 3 changes the direction or moves, the display positions, angles, sizes, and the like of the installation position objects 106, 107, and 108 in the video 7 also change based on the relative positional relationship with the vehicle 1 following the movement of the direction or position.

The installation position objects 106, 107, and 108 are displayed on the video 7 in this manner, so that the worker 3 can clearly grasp where the three target plates necessary for the optical axis adjustment of the front camera 16 should be installed. The worker 3 can install the three target plates at correct positions by installing the three target plates so as to be superimposed on the three installation position objects 106, 107, and 108 displayed on the AR device 5.

In S150, when the selected in-vehicle sensor is the rear sensors 18 and 19, the process proceeds to S180. In S180, as a function of the object control unit 38, an installation position object indicating a position where an adjustment facility used for an adjustment work of the rear sensors 18 and 19 (that is, an individual reflector for each of the rear sensors 18 and 19) is to be installed is displayed on the video 7.

Figure 7:
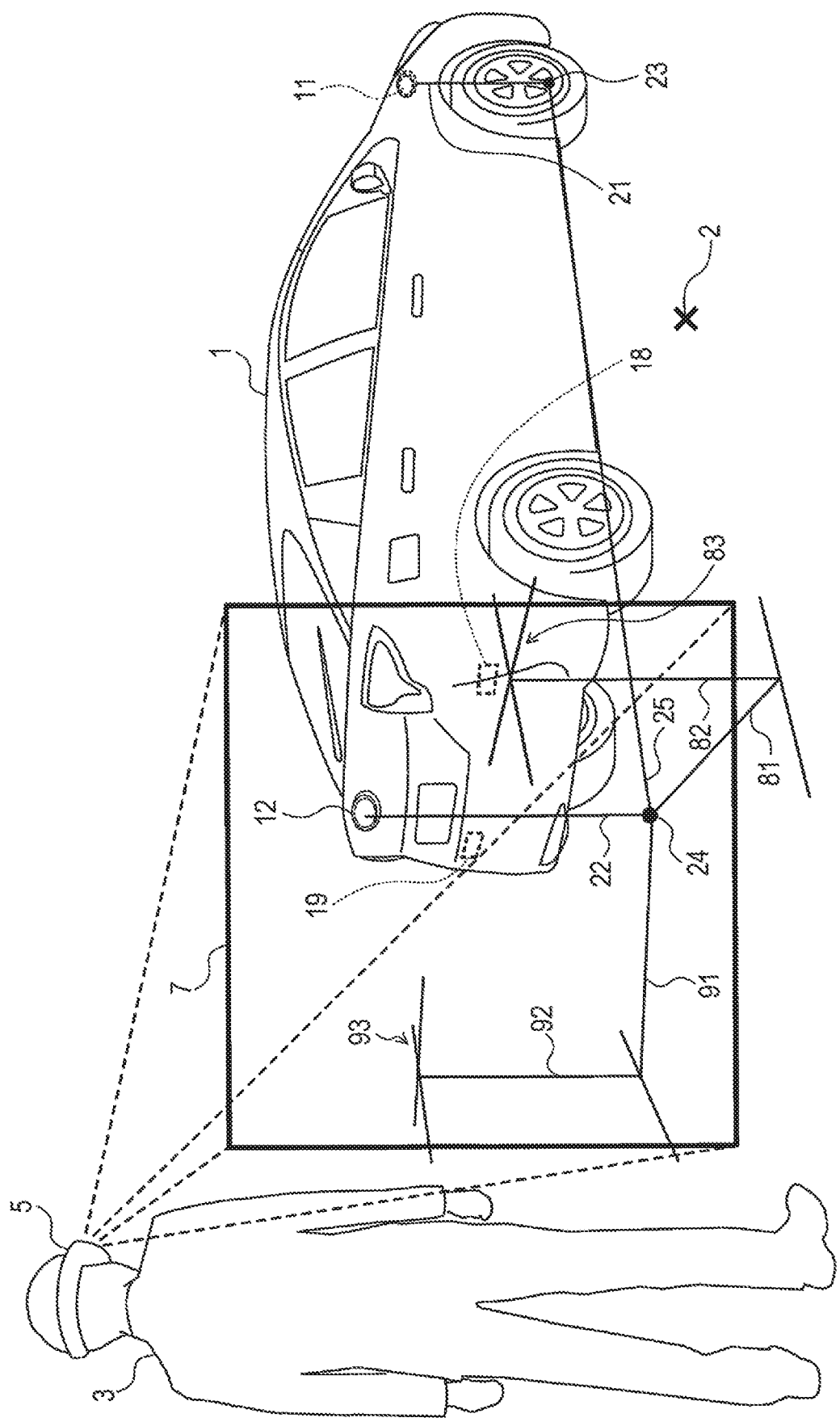
FIG. 7 is an illustrative diagram showing an example in which installation position objects corresponding to two rear sensors are displayed in a superimposed manner on the AR device.

Specifically, for example, as shown in FIG. 7, two installation reference lines 81 and 91 are displayed on the floor surface 2 from the rear reference point 24 on the center line 25 in a predetermined angular direction with respect to the center line 25. The two installation reference lines 81 and 91 are in a line symmetrical positional relationship with respect to the center line 25.

In addition, the installation perpendicular lines 82 and 92 perpendicular to the floor surface 2 are displayed at positions apart from the rear reference point 24 by a predetermined distance in the installation reference lines 81 and 91. Then, the installation position objects 83 and 93 are displayed at positions at a predetermined height from the floor surface 2 in the installation perpendicular lines 82 and 92, respectively. The predetermined height is also set in advance in accordance with the vehicle type and the in-vehicle sensor to be adjusted.

The relative positional relationship between the vehicle 1 and the installation position objects 83 and 93 is also constant. For that reason, when the worker 3 changes the direction or moves, the display positions, angles, sizes, and the like of the installation position objects 83 and 93 in the video 7 also change based on the relative positional relationship with the vehicle 1 following the movement of the direction or position.

The installation position objects 83 and 93 are displayed on the video 7 in this manner, so that the worker 3 can clearly grasp where to install the reflectors necessary for adjusting the angle axes of the rear sensors 18 and 19. The worker 3 can install each reflector at a correct position by installing the respective reflectors so as to be superimposed on the two installation position objects 83 and 93 displayed on the AR device 5.

In the processes of S160, S170 and S180, the work related information may also be displayed on the video 7. Alternatively, the work related information may be displayed or hidden in accordance with the operation of the worker 3.

In S190, as a function of the image recognition control unit 36, it is determined whether the adjustment facility has been installed at the correct position (that is, at the position where the installation position objects are displayed in the video 7). Specifically, for example, if the positional relationship between the actual adjustment facility and the installation position object is correct in the video 7 by use of the image recognition function, it is determined that the adjustment facility is installed at the correct position.

If the adjustment facility is not installed in the correct position, the determination in S190 is repeated. If the adjustment facility is installed in the correct position, the process proceeds to S200.

In S200, a notification process is performed. This notification process is a process for notifying the worker 3 that the adjustment facility has been installed at the correct position. A specific notification method may be appropriately determined, for example, specific notification information may be displayed on the display unit 34, or specific voice may be output by a sound output device (not shown).

When there are multiple adjustment facilities to be installed, in the processes of S190 to S200, for example, when all of the multiple adjustment facilities are correctly installed, the process may be shifted from S190 to S200. Further, for example, it may be determined whether each adjustment facility has been installed correctly, and notification process may be performed based on the determination result.

After the notification process has been performed in S200, the in-vehicle sensor adjustment support process is terminated. After the notification process has been performed in S200, the process may be returned to S140. With the above process, after the adjustment work of one in-vehicle sensor has been completed, the adjustment work can smoothly shift to the adjustment work of another in-vehicle sensor in the same vehicle.

(1-4) Effects of Embodiments

According to the embodiment described above, the following effects (1a) to (1d) are obtained.

(1a) According to the present embodiment, the installation position of the adjustment facility is calculated on the basis of the two places and the floor surface 2 imaged by the camera 32, and the installation position objects are superimposed and displayed on the calculated installation position in the video displayed on the display unit 34.

As a result, the worker can easily grasp the installation position from the image displayed on the display unit 34. Then, the worker can install the adjustment facility at an appropriate position by installing the adjustment facility so that the actual adjustment facility matches the position of the installation position object displayed in a superimposed manner while watching the video.

This makes it possible to easily provide the installation position of the adjustment facility of the in-vehicle sensor to the worker with a small number of man-hours.

(1b) In the above embodiment, the images of the two emblems 11 and 12 mounted on the vehicle are recognized, and the two reference points 23 and 24 are calculated based on the recognition result. For that reason, the two reference points 23 and 24 required to calculate the installation position can be easily and appropriately calculated.

Further, the center line 25 is calculated according to the two reference points 23 and 24, and the installation position is calculated with reference to the center line 25. For that reason, the installation position can be easily and appropriately calculated.

(1c) In the above embodiment, the vehicle type is selected by the worker prior to the calculation of the installation position. Then, the installation position is calculated in accordance with the selected vehicle type. For that reason, the installation position can be accurately calculated according to the vehicle type.

In addition, when the worker is made to select the in-vehicle sensor as the adjustment work target, options of the in-vehicle sensors is displayed by focusing on the in-vehicle sensors corresponding to the selected vehicle type. For that reason, the worker can easily select the in-vehicle sensor corresponding to the vehicle type.

(1d) In the above embodiment, when the actual adjusting facility is installed at the calculated installation position, the worker is notified of the installation position. For that reason, the worker can easily install the adjustment facility at the calculated installation position.

2. Other Embodiments

Although the embodiment of the present disclosure have been described above, the present disclosure is not limited to the embodiment described above, and various modifications can be made to implement the present disclosure.

Figure 3:
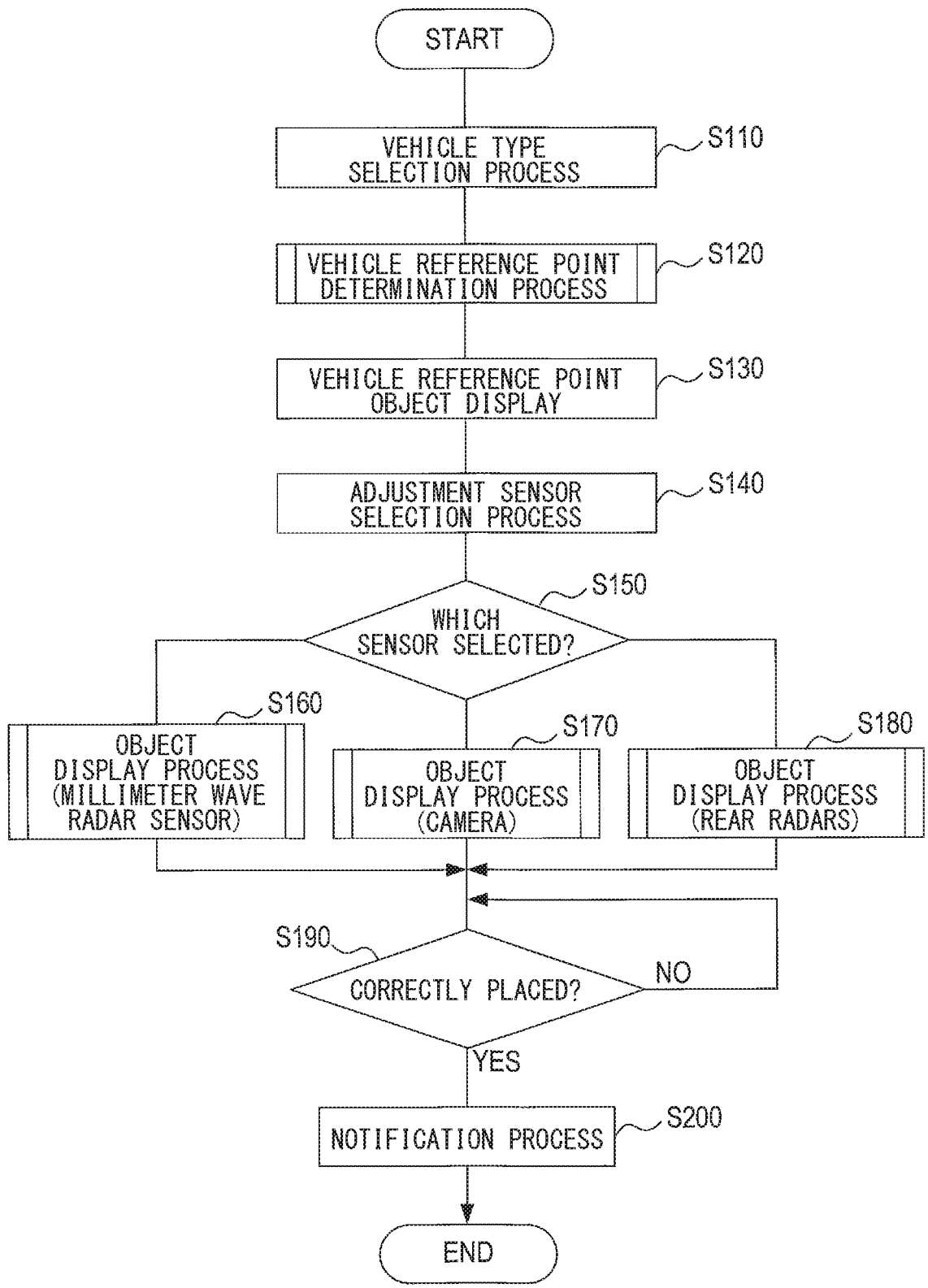
FIG. 3 is a flowchart of the in-vehicle sensor adjustment support process.

(2-1) In the above embodiment, in the process of S120 of FIG. 3, the center point in the vehicle widthwise directions at two places in the front and rear of the vehicle is recognized based on the front emblem 11 and the rear emblem 12, but the center point may be recognized by other methods.

For example, the center position of the front license plate 13 may be recognized as the center point on the vehicle front side by image recognition of the front license plate 13, and the center position of the rear license plate 14 may be recognized as the center point on the vehicle rear side by image recognition of the rear license plate 14.

Also, in this case, for example, the data of the license plate to be recognized may be stored in advance in the memory and automatically recognized by collating with the data. Further, for example, a specific gesture of the worker 3 is shown with respect to the license plate displayed in the video 7, so that the image showing the gesture may be recognized as the license plate.

Further, the present disclosure is not limited to recognizing a specific component in the vehicle 1, and for example, a specific marker may be installed at a specific position in the vehicle 1 or a specific position in the vicinity of the vehicle 1, and the center point may be recognized by image recognition of the marker.

Figure 8:
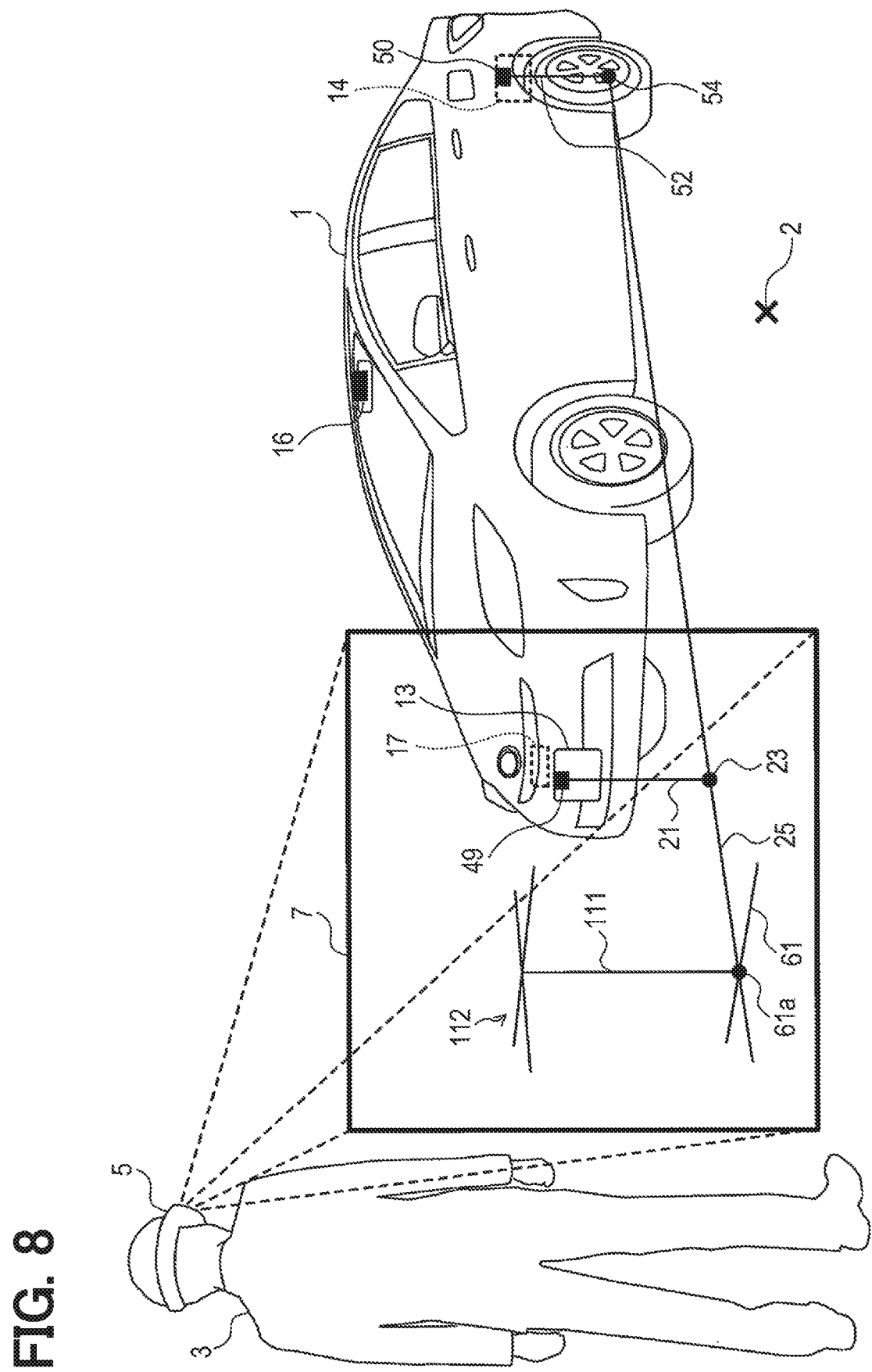
FIG. 8 is an illustrative diagram showing an example in which a center of the vehicle is recognized by use of a marker.

An example of the recognition of the center point by use of the marker is shown in FIG. 8. In FIG. 8, a front marker 49 is provided at the upper center of the front license plate 13, and a rear marker 50 is provided at the upper center of the rear license plate 14. The image data of the markers 49 and 50 may be stored in advance in the memory of the AR device 5, or the image data may be downloaded from the server 201, the PC 202, or the like to the AR device 5 and acquired.

The markers 49 and 50 are individually recognized by the image recognition control unit 36 in the AR device 5. The processing after the markers 49 and 50 have been recognized is basically the same as the processing after the emblems 11 and 12 have been recognized in the above embodiment. In other words, in the description of the above embodiment, the emblems 11 and 12 may be replaced with the markers 49 and 50.

However, when the position of the front emblem 11 and the position of the front license plate 13 are deviated in the vehicle longitudinal direction, a distance from the front reference point 23 to the installation reference point 61a differs from a distance from the front reference point 23 to the installation reference point 61a in FIG. 6 by the amount of the deviation.

The position at which the marker is installed is not limited to each license plate. Any marker may be placed anywhere as long as the center point in the vehicle width direction can be recognized by use of the marker.

Alternatively, the image recognition function may be used to recognize a region of the vehicle width from the image of the entire vehicle 1, and the center point in the vehicle width direction may be recognized from the region of the vehicle width. It should be noted that the method of recognizing the region of the vehicle width may be another method. For example, markers may be provided at both left and right ends of the vehicle, and a region of the vehicle width may be recognized by image recognition of the markers. Alternatively, specific gestures are indicated to the left end of the vehicle and the right end of the vehicle displayed in the video 7, the positions at which the gestures are indicated may be recognized as the left and right ends of the vehicle, and the center point may be recognized based on the recognition result.

(2-2) A part of the functions of the AR device 5 of the above embodiment may be implemented in a device different from the AR device 5.

Figure 9:
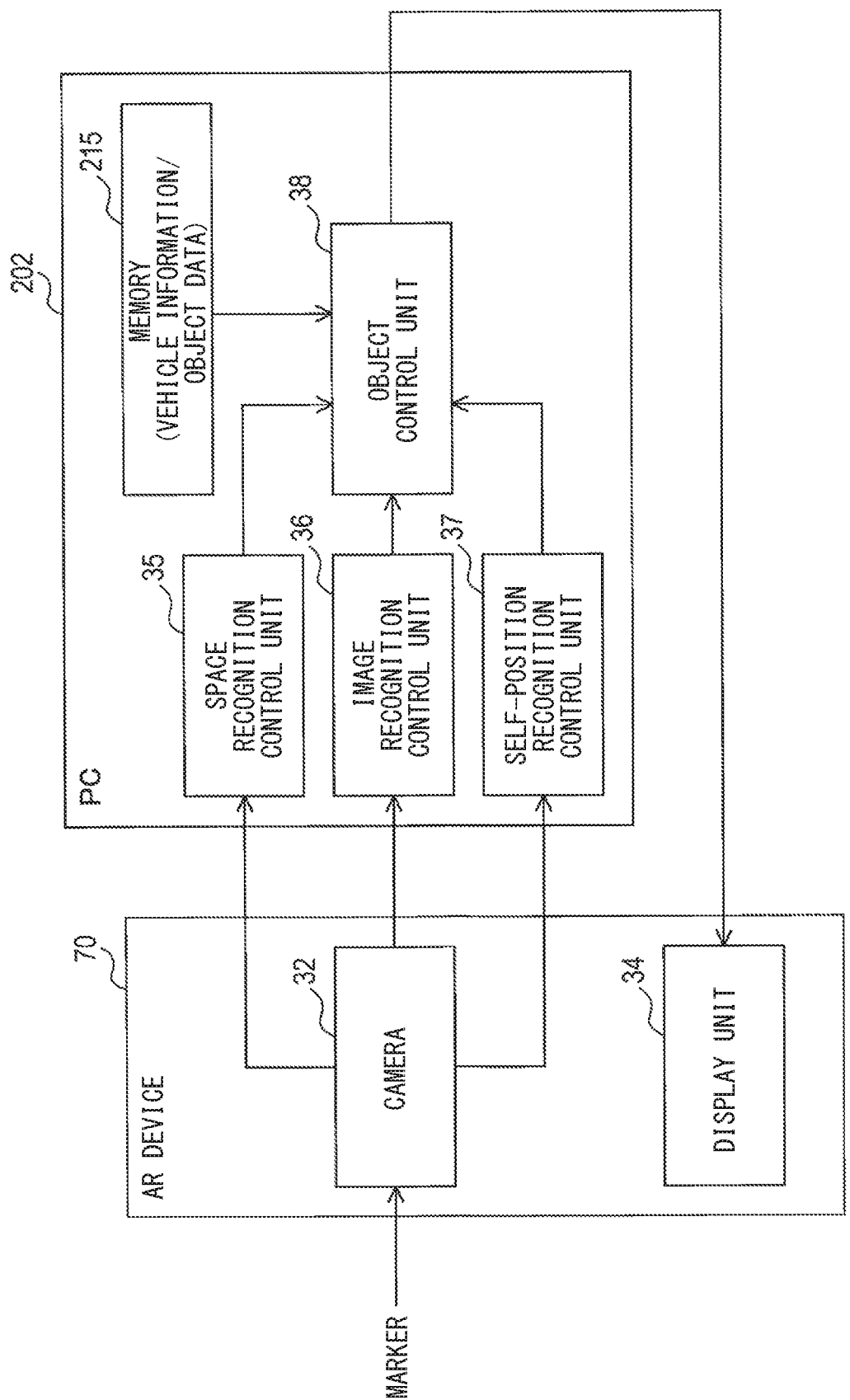
FIG. 9 is a block diagram showing another configuration example of the AR device.

For example, as shown in FIG. 9, the AR device 70 may include the camera 32 and the display unit 34, and the functions of the space recognition control unit 35, the image recognition control unit 36, and the self-position recognition control unit 37 may be implemented in a device (for example, the PC 202) different from the AR device 70.

In this case, at least one marker may be installed in at least one of the vehicle 1 and its surroundings, the at least one marker may be imaged by the camera 32, and generation of the space recognition information by the space recognition control unit 35 and generation of the self-position recognition information by the self-position recognition control unit 37 may be performed on the basis of the captured image. The space recognition control unit 35 may be configured, for example, to spatially recognize an object of interest (for example, a floor, a vehicle, etc.) from the installation position of a specific marker. The self-position recognition control unit 37 may be configured to recognize the self-position based on, for example, the direction of a specific marker imaged by the camera 32 and the result of the space recognition.

In the configuration shown in FIG. 9, data of the image captured by the camera 32 is transmitted from the AR device 70 to the PC 202 by a communication. The image data of the video 7 generated by the object control unit 38 in the PC 202 is transmitted from the PC 202 to the AR device 70 by a communication.

In a configuration shown in FIG. 9, vehicle type information and object data are stored in advance in the memory 215 of the PC 202. The PC 202 may perform various processes based on the information and the data stored in the memory 215. However, the information and data may be acquired from another device such as the server 201.

(2-3) The camera 32 may be a monocular camera, or may be a camera with multiple lenses, for example, a stereo camera.

(2-4) In order to correct the position of the generated installation position object, a correction marker may be installed, the relative positional relationship between the calculated installation position object and the correction marker may be stored at the time of calculating the installation position object, and the position of the installation position object may be corrected based on the relative positional relationship.

(2-5) The specific configuration of the AR device is not limited to the goggle type. For example, a tablet terminal provided with a camera and a display unit may have the function of an AR device.

(2-6) The multiple functions of one component in the above embodiments may be realized by multiple components, or a function of one component may be realized by multiple components. In addition, multiple functions of multiple components may be realized by one component, or a single function realized by multiple components may be realized by one component. In addition, a part of the configuration of the above embodiment may be omitted. At least a part of the configuration of the above embodiment may be added to or substituted for the configuration of the other above embodiment.

What is claimed is:

1. An installation position information providing apparatus comprising:
an imaging device configured to capture a video;
a display device configured to display the video captured by the imaging device;
a recognition unit configured to recognize specific two parts in a vehicle or in a vicinity of the vehicle included in the video, and a floor surface included in the video and on which the vehicle is mounted, from the video captured by the imaging device;
a calculation unit configured to calculate an installation position of an adjustment facility in the video based on the two parts and the floor surface recognized by the recognition unit, the adjustment facility being used for an adjustment work of an in-vehicle sensor mounted on the vehicle;
a superimposing display unit configured to display an installation position object at the installation position calculated by the calculation unit in a superimposed manner, in the video displayed on the display device, the installation position object being an image indicative of the installation position; and
a vehicle type information acquisition unit configured to acquire vehicle type information indicating a vehicle type of the vehicle, wherein
the calculation unit is configured to calculate the installation position according to the vehicle type information acquired by the vehicle type information acquisition unit.

2. The installation position information providing apparatus according to claim 1, wherein
the recognition unit is configured to recognize at least two selected from at least one emblem mounted on the vehicle, at least one license plate mounted on the vehicle, and a vehicle width of the vehicle, and to recognize the two parts based on the at least two that are recognized.

3. The installation position information providing apparatus according to claim 1, wherein
the calculation unit is configured to execute:
a reference point calculation process of calculating two reference points on the floor surface respectively corresponding to the two parts based on the two parts recognized by the recognition unit;
a reference line calculation process of calculating at least one reference line passing through at least one of the two reference points on the floor surface based on the two reference points calculated by the reference point calculation process; and
an installation position calculation process of calculating the installation position based on the two reference points calculated by the reference point calculation process and the at least one reference line calculated by the reference line calculation process.

4. The installation position information providing apparatus according to claim 1, further comprising:
an option presenting unit configured to present options for the adjustment facility corresponding to the in-vehicle sensor mountable on the vehicle indicated by the vehicle type information based on the vehicle type information acquired by the vehicle type information acquisition unit; and
a selection accepting unit configured to accept a selection of any one option for the adjustment facility among the options presented by the option presenting unit, wherein the calculation unit is configured to calculate the installation position of the adjustment facility selected by the selection accepting unit.

5. The installation position information providing apparatus according to claim 1, further comprising
a notification unit configured to perform a specific notification when a position corresponding to the installation position object displayed in a superimposed manner by the superimposing display unit matches an actual position of the adjustment facility in the video displayed on the display device.

6. The installation position information providing apparatus according to claim 1, wherein
the imaging device, the display device, the recognition unit, the calculation unit, and the superimposing display unit are accommodated in the same single housing.

7. An installation position information providing method comprising:
capturing a video;
displaying the video that is captured;
recognizing specific two parts in a vehicle or in a vicinity of the vehicle included in the video and a floor surface included in the video and on which the vehicle is mounted, from the video that is captured;
calculating an installation position of an adjustment facility in the video based on the two parts and the floor surface that are recognized, the adjustment facility being used for an adjustment work of an in-vehicle sensor mounted on the vehicle;
displaying an installation position object at the installation position that is calculated in a superimposed manner, in the video that is displayed, the installation position object being an image indicative of the installation position;
acquiring vehicle type information indicating a vehicle type of the vehicle; and
calculating the installation position according to the vehicle type information.

8. An installation position information providing apparatus comprising:
an imaging device configured to capture a video;
a display device configured to display the video captured by the imaging device;
a processor; and
a memory storing instructions configured to, when executed by the processor, cause the processor to:
recognize specific two parts in a vehicle or in a vicinity of the vehicle included in the video, and a floor surface included in the video and on which the vehicle is mounted, from the video captured by the imaging device;
calculate an installation position of an adjustment facility in the video based on the two parts and the floor surface that are recognized, the adjustment facility being used for an adjustment work of an in-vehicle sensor mounted on the vehicle;
display an installation position object at the installation position that is calculated in a superimposed manner, in the video displayed by the display device, the installation position object being an image indicative of the installation position,
acquire vehicle type information indicating a vehicle type of the vehicle; and
calculate the installation position according to the vehicle type information.

\* \* \* \* \*